UNITED STATES PATENT OFFICE.

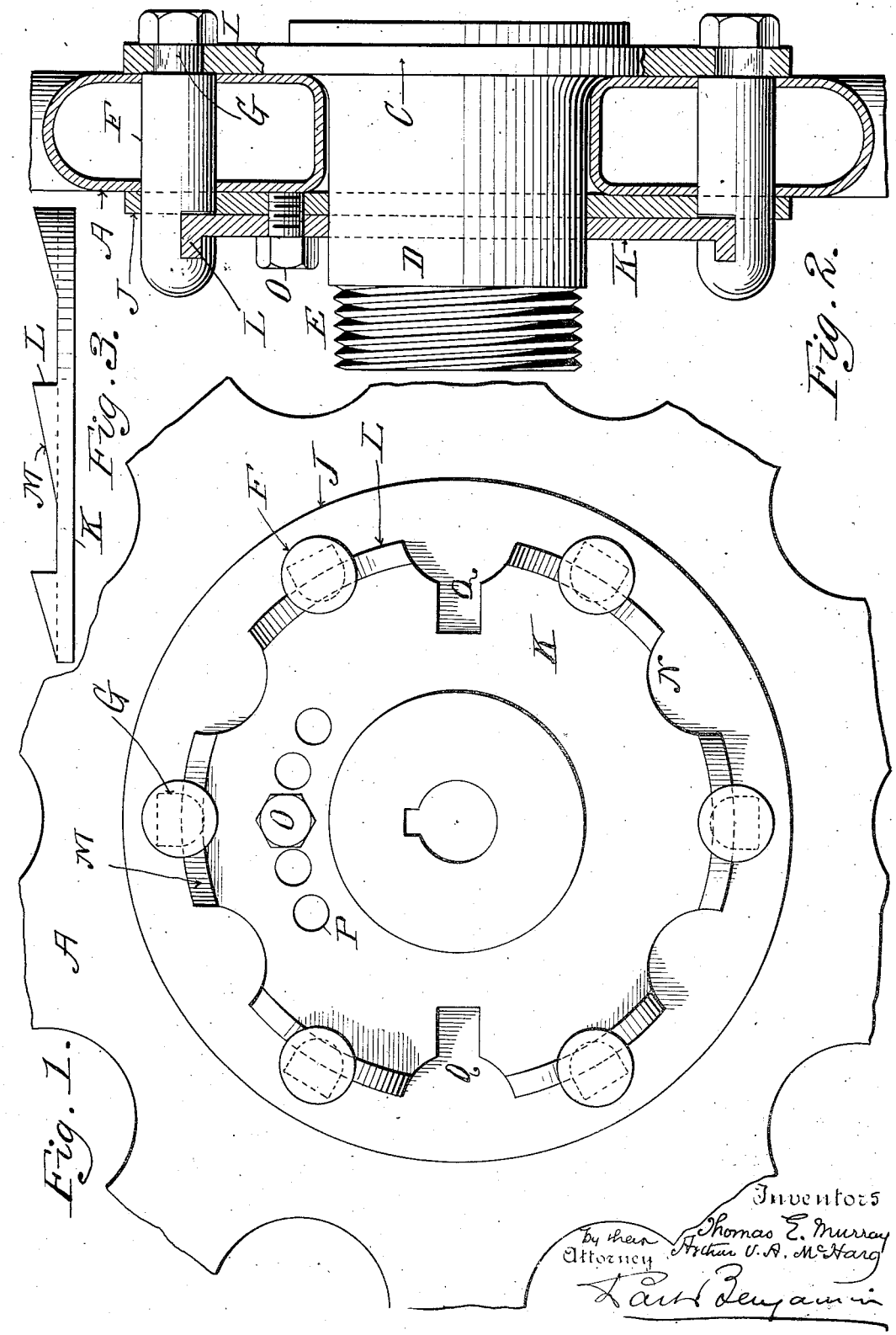

THOMAS E. MURRAY AND ARTHUR V. A. McHARG, OF NEW YORK, N. Y.

DEMOUNTABLE VEHICLE-WHEEL.

1,219,133.　　　　　Specification of Letters Patent.　　Patented Mar. 13, 1917.

Application filed May 29, 1916. Serial No. 100,594.

*To all whom it may concern:*

Be it known that we, THOMAS E. MURRAY and ARTHUR V. A. McHARG, citizens of the United States, residing at New York, in the county of New York and State of New York, have invented a certain new and useful Improvement in Demountable Vehicle-Wheels, of which the following is a specification.

The invention relates to demountable vehicle wheels, and consists in the construction whereby the wheel nave is locked to studs extending from a hub flange through said nave.

In the accompanying drawings—

Figure 1 is an elevation of the front end of the hub, and front side of the wheel nave, showing the locking device engaged. Fig. 2 is a diametral section of the same. Fig. 3 is an edge view of a portion of the locking plate.

Similar letters of reference indicate like parts.

A represents the nave portion of a vehicle wheel, preferably made hollow and of sheet metal. The hub has a rear flange C, a cylindrical portion D, upon which the nave A is received, and an outer threaded portion E for the reception of the usual screw cap. Entering circular openings in the walls of the nave A are a number of studs F. Each stud is cylindrical over the greater portion of its length, and is shouldered to abut against the front face of flange C. Beyond the shoulder and for a length equal to the thickness of flange C, the stud has a portion G of smaller cross sectional area, and substantially polygonal in cross section to fit in a similar opening in said flange. We have practically used the cross sectional shape indicated by dotted lines in Fig. 1. That is to say, said portion G has one flat side and its remaining contour is curved or convex. Outside of the portion G the stud may be cylindrical and threaded to receive a nut I. The shoulder on the stud bears on one side of flange C, the fastening nut I bears on the other side of said flange, and the shaped portion G fits in the correspondingly shaped opening extending through said flange. In this way, the studs are secured to said flange and protrude from the front face thereof, so that when the wheel nave A is placed upon the hub they pass through the openings in said nave. Said studs also pass through openings in an annular plate J which is placed upon the hub and in contact with the front face of the nave A. In the portion of each stud which protrudes beyond the plate and in the curved side thereof is formed a transverse undercut recess. K is an annular locking disk, which is rotatable upon the hub. On the outer face of disk K and at the circumferential edge thereof are as many cam projections L as there are studs F, each projection having an inclined face M. In the circumferential edge of disk K and between the projections L are formed recesses N.

When the locking disk K is adjusted in position, the projecting ends of the studs F enter the recesses N, thus permitting the disk K to be placed in contact with annular plate J. The locking disk K is then rotated on the hub so as to bring the projections L into the undercut recesses in studs F. In this way, the wheel nave A is locked upon each stud, and the said studs are locked together, and by reason of the inclined faces of the cam projections, the locking disk clamps the nave tightly against the hub flange C. A headed bolt O is finally passed through one of the openings P in locking disk K, and its threaded end engages in an opening in plate J, by which means any rotation of the locking plate on the hub after the parts are locked is prevented. The object of providing several openings P in the locking disk K is to allow for any irregularities of construction or displacements due to wear, which might bring a single opening, if there were but one in said disk, out of registry with the opening in plate J. For convenience in rotating the locking disk, I provide notches Q communicating with two diametrically opposite recesses N in the locking disk K, in which notches may be inserted the points of a suitable spanner. The object of making the portions G of the studs polygonal, or with, as here shown, a flat side, and of placing the openings with their corresponding flat sides toward the circumference of flange C, is to insure that the studs shall be properly placed to bring their recesses into position to be engaged by the cam projections L on the locking disk K.

We claim:

1. A demountable vehicle wheel, comprising a hub, a flange thereon, an annular plate on said hub, a wheel nave interposed between said flange and said plate, studs on said flange extending through openings in said nave and said plate and having transverse undercut recesses on their protruding portions, an annular locking disk disposed on said hub in front of said plate, and cam projections on the front side of said locking disk entering said stud recesses to lock together said disk and said studs.

2. A demountable vehicle wheel, comprising a hub, a flange thereon, an annular plate on said hub, a wheel nave interposed between said flange and said plate, studs on said flange extending through openings in said nave and said plate and having transverse undercut recesses on their protruding portions, an annular locking disk disposed on said hub in front of said plate, cam projections on the front side of said locking disk entering said stud recesses to lock together said disk and said studs, and means for securing said disk and said plate in locking engagement.

In testimony whereof we have affixed our signatures in presence of two witnesses.

THOMAS E. MURRAY.
ARTHUR V. A. McHARG.

Witnesses:
GERTRUDE T. PORTER,
MAY T. McGARRY.